United States Patent [19]
Cymbal et al.

[11] Patent Number: 5,669,270
[45] Date of Patent: Sep. 23, 1997

[54] ROTARY TELESCOPEABLE SHAFT WITH RESILIENT INSERT

[75] Inventors: William David Cymbal, Freeland; Donald Anthony Niedzielski, Bay City, both of Mich.

[73] Assignee: General Motors Corporation, Detroit, Mich.

[21] Appl. No.: 624,229

[22] Filed: Mar. 29, 1996

[51] Int. Cl.⁶ .................................................. B62D 1/20
[52] U.S. Cl. .................. 74/493; 280/777; 403/109; 464/181; 464/182
[58] Field of Search .................. 74/493; 280/777; 464/182, 179, 181; 403/109

[56] References Cited

U.S. PATENT DOCUMENTS

| | | | |
|---|---|---|---|
| 3,444,753 | 5/1969 | Runkle | 74/493 |
| 4,105,346 | 8/1978 | Gelinas | 403/104 |
| 4,509,775 | 4/1985 | Arndt | 280/779 |
| 4,911,034 | 3/1990 | Kulczyk et al. | 74/492 |
| 5,086,661 | 2/1992 | Hancock | 74/493 |
| 5,152,627 | 10/1992 | Arnold | 403/109 |
| 5,348,345 | 9/1994 | Dykema et al. | 280/777 |
| 5,417,614 | 5/1995 | Dykema et al. | 464/162 |
| 5,509,324 | 4/1996 | Cymbal | 403/109 |

*Primary Examiner*—Charles A. Marmor
*Assistant Examiner*—David M. Fenstermacher
*Attorney, Agent, or Firm*—Saul Schwartz

[57] ABSTRACT

A rotary telescopeable shaft particularly suited for use as an intermediate steering shaft of a motor vehicle including a cylindrical tubular shaft having a flat side, a cylindrical solid shaft slidably telescoped inside of the tubular shaft having a flat side facing the flat side on the tubular shaft and coupling the shafts for unitary rotation, and a unitized resilient insert concealed in a notch in the solid shaft. The notch has a pair of lateral ramps which converge with the flat side of the tubular shaft and a longitudinal ramp which converges with a cylindrical segment of the tubular shaft. The unitized resilient insert consists of a slider on each lateral ramp, a slider on the longitudinal ramp, and a spring wedging the sliders between the lateral ramps and the flat side of the tubular shaft to eliminate runnning clearance perpendicular to the flat side and between the longitudinal ramp and the cylindrical segment of the tubular shaft to eliminate running clearance parallel to the flat side.

3 Claims, 3 Drawing Sheets

ROTARY TELESCOPEABLE SHAFT WITH RESILIENT INSERT

FIELD OF THE INVENTION

This invention relates to telescopeable shafts such as intermediate steering shafts of motor vehicles.

BACKGROUND OF THE INVENTION

An intermediate steering shaft connects a primary or main steering shaft on a steering column of a motor vehicle with an input shaft of a steering gear on the vehicle remote from the steering column. Typically, the intermediate steering shaft includes a cylindrical solid shaft telescoped in a cylindrical tubular shaft with running clearance therebetween and coupled to the tubular shaft for unitary rotation by engagement of flat sides on the solid shaft against flat sides on the tubular shaft. Running clearance between the solid and tubular shafts perpendicular to the flat sides manifests itself upon reversal of the direction of rotation of the intermediate steering shaft as relative rotation known as angular lash. Running clearance between the solid and tubular shafts parallel to the flat sides may manifest itself twice during each revolution of the intermediate steering shaft as an audible click or knock attributable to articulation between the solid and tubular shafts in a plane parallel to the flat sides. U.S. Pat. Nos. 4,509,775, 5,348,345, and 5,417,614, all assigned to the assignee of this invention, describe telescopeable shafts having springs and/or in situ injection molded plastic blocks between solid and tubular shafts to control angular lash.

SUMMARY OF THE INVENTION

This invention is a new and improved telescopeable shaft particularly suited for use as an intermediate steering shaft of a motor vehicle including a cylindrical tubular shaft having a flat side, a cylindrical solid shaft slidably telescoped inside of the tubular shaft having a flat side facing the flat side on the tubular shaft and coupling the shafts for unitary rotation, and a unitized resilient insert concealed in a notch in the solid shaft which spreads apart the solid and tubular shafts both parallel and perpendicular to their flat sides to eliminate running clearance in both directions. The notch has a pair of coplanar lateral ramps which converge with the flat side of the tubular shaft and a longitudinal ramp which converges with a cylindrical segment of the tubular shaft. The resilient insert consists of a slider on each lateral ramp bearing against the convergent flat side of the tubular shaft, a slider on the longitudinal ramp bearing against the convergent cylindrical segment, and a spring urging the sliders on the lateral ramps and the slider on the longitudinal ramp in opposite directions so that the sliders on the lateral ramps spread apart the solid and tubular shafts perpendicular to their flat sides and the slider on the longitudinal ramp spreads apart the solid and tubular shafts parallel to their flat sides. The sliders on the lateral ramps engage the convergent flat side of the tubular shaft on opposite sides of a longitudinal center plane of the steering shaft to minimize tilting of the solid shaft inside the tubular shaft.

DESCRIPTION OF A PREFERRED EMBODIMENT

Figure 1:
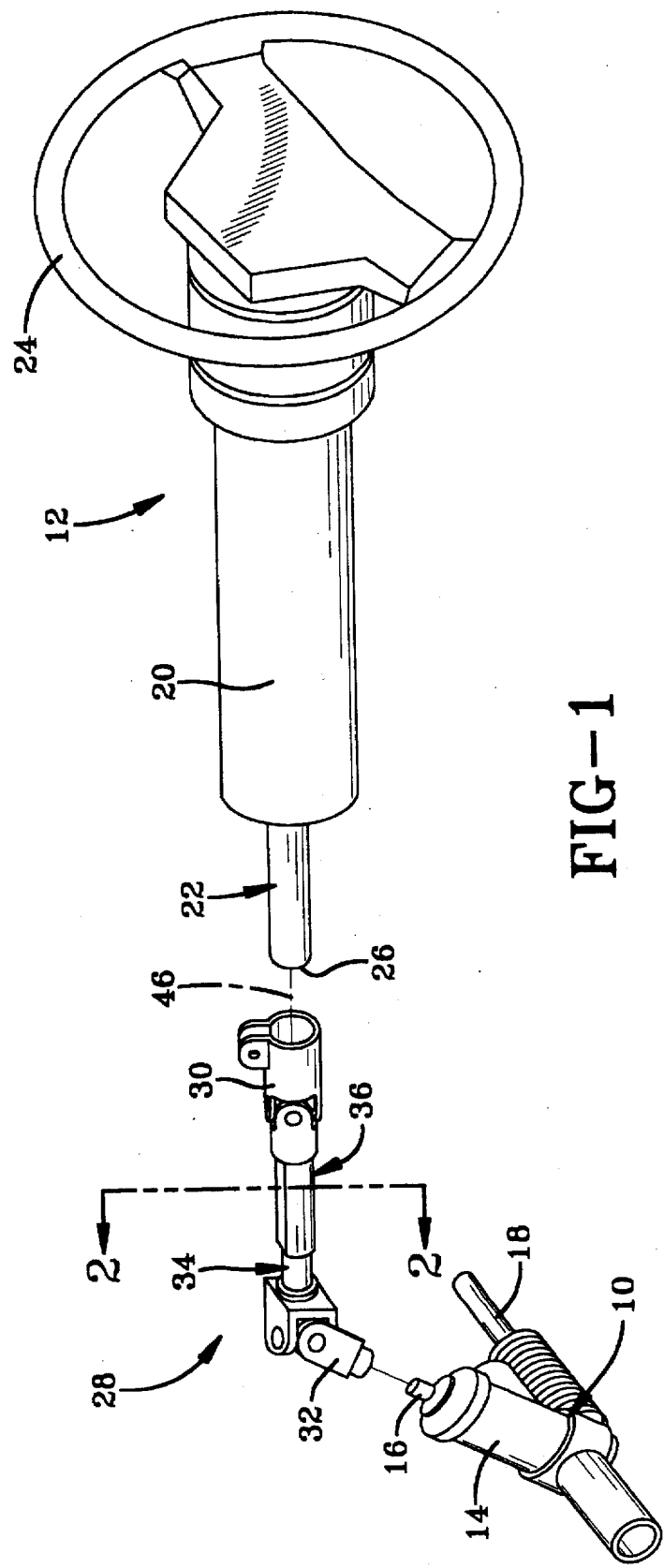
FIG. 1 is a fragmentary perspective view of a telescopeable shaft according to this invention between a primary steering shaft and a steering gear input shaft of a motor vehicle.

Referring to FIG. 1, a motor vehicle, not shown, has mounted thereon a steering gear 10 and a steering column 12. The steering gear 10 includes a housing 14, an input shaft 16 rotatably supported on the housing 14, a rack bar 18, and rack and pinion gearing, not shown, in the housing which converts rotation of the input shaft 16 to lateral translation of the rack bar 18. Opposite ends, not shown, of the rack bar are linked to steerable wheels of the motor vehicle in conventional fashion so that rotation of the input shaft 16 steers the vehicle.

The steering column 12 includes a tubular mast jacket 20, a main or primary steering shaft 22 rotatably supported on the mast jacket, and a steering wheel 24 rigidly connected to the primary steering shaft at the top of the mast jacket. The span between a lower end 26 of the primary steering shaft 22 and the steering gear input shaft 16 is bridged by a telescopeable intermediate steering shaft 28 according to this invention.

The intermediate steering shaft 28 is connected to the primary steering shaft 22 by an upper universal joint 30 and to the steering gear input shaft by a lower universal joint 32. The intermediate steering shaft 28 includes a cylindrical solid shaft 34 slidably telescoped inside of the tubular shaft 36. The solid shaft is flattened on opposite sides to define a pair of cylindrical segments 38A-38B and a pair of longitudinally extending, parallel flat sides 40A-40B. The tubular shaft is flattened on opposite sides to define a pair of cylindrical segments 42A-42B and a pair of longitudinally extending, parallel flat sides 44A-44B.

The flat sides 40A-40B and the cylindrical segments 38A-38B on the solid shaft face the flat sides 44A-44B and the cylindrical segments 42A-42B on the tubular shaft with running clearance therebetween and positively engage to couple the shafts for unitary rotation about a longitudinal centerline 46 of the intermediate steering shaft. The aforesaid running clearance permits relatively easy telescopic translation between the solid and tubular shafts for installation of the intermediate steering shaft 28 between the primary steering shaft and the steering gear input shaft. The portion of the running clearance perpendicular to the flat sides 40A-40B, 44A-44B manifests itself upon reversal of the direction of rotation of the intermediate steering shaft as relative rotation about the centerline 46, commonly referred to as angular lash. The portion of the running clearance parallel to the flat sides 40A-40B, 44A-44B may manifest itself twice during each revolution of the intermediate steering shaft as an audible click or knock attributable to articulation between the solid and tubular shafts in a plane parallel to the flat sides.

Figure 2:
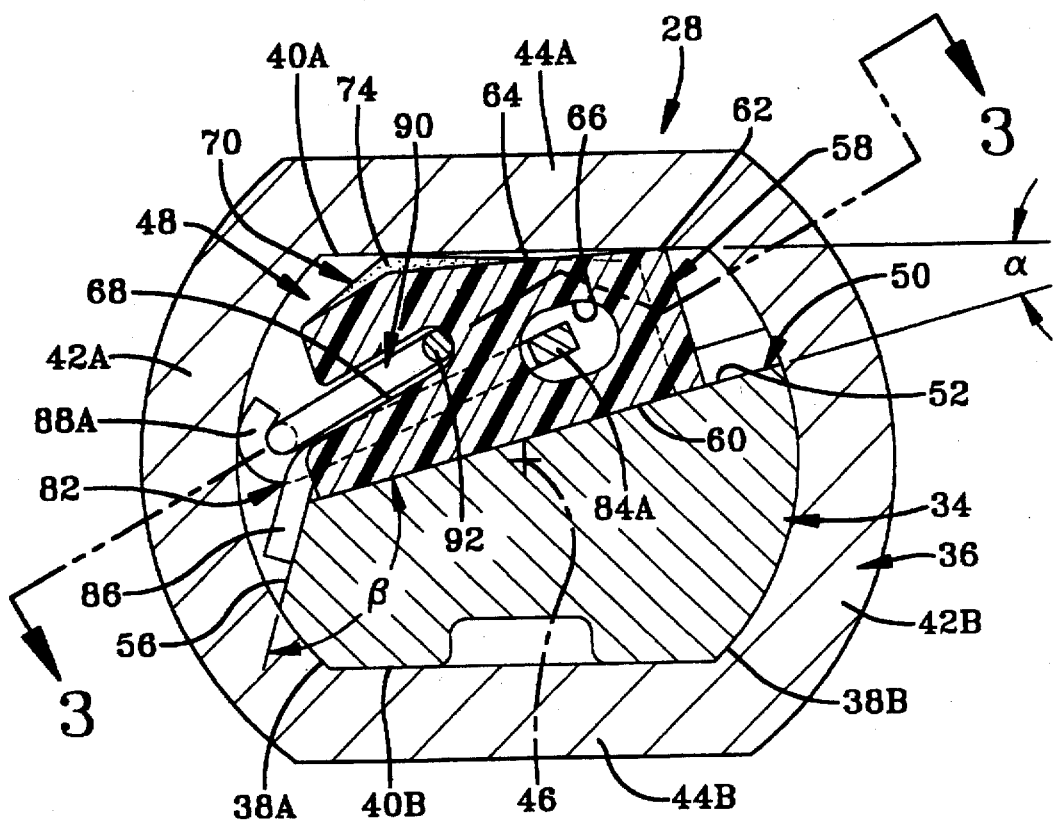
FIG. 2 is an enlarged sectional view taken generally along the plane indicated by lines 2—2 in FIG. 1.
Figure 3:
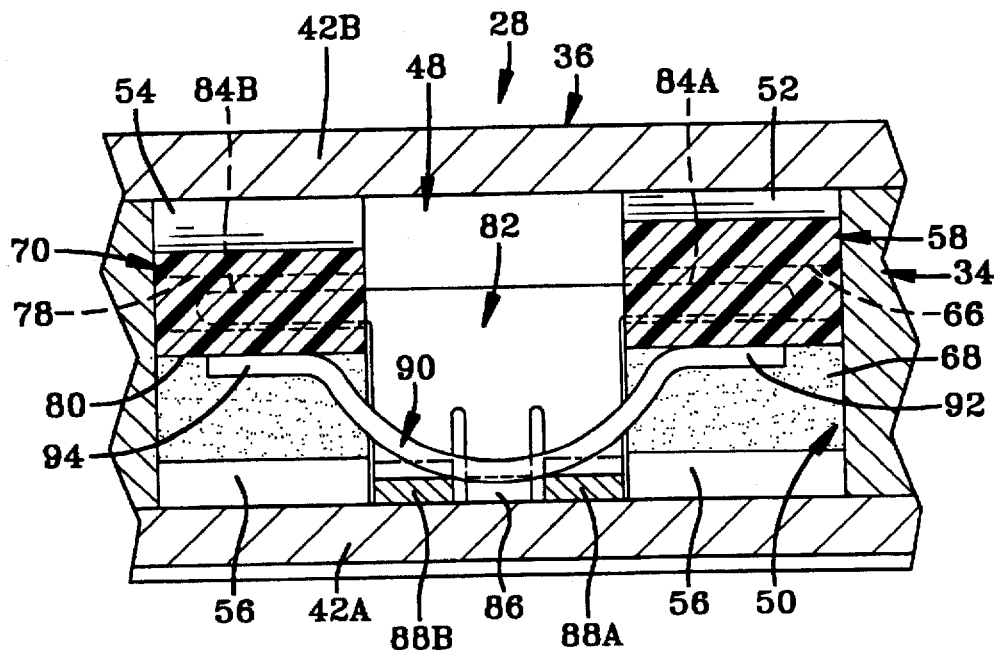
FIG. 3 is a sectional view taken generally along the plane indicated by lines 3—3 in FIG. 2.
Figure 4:
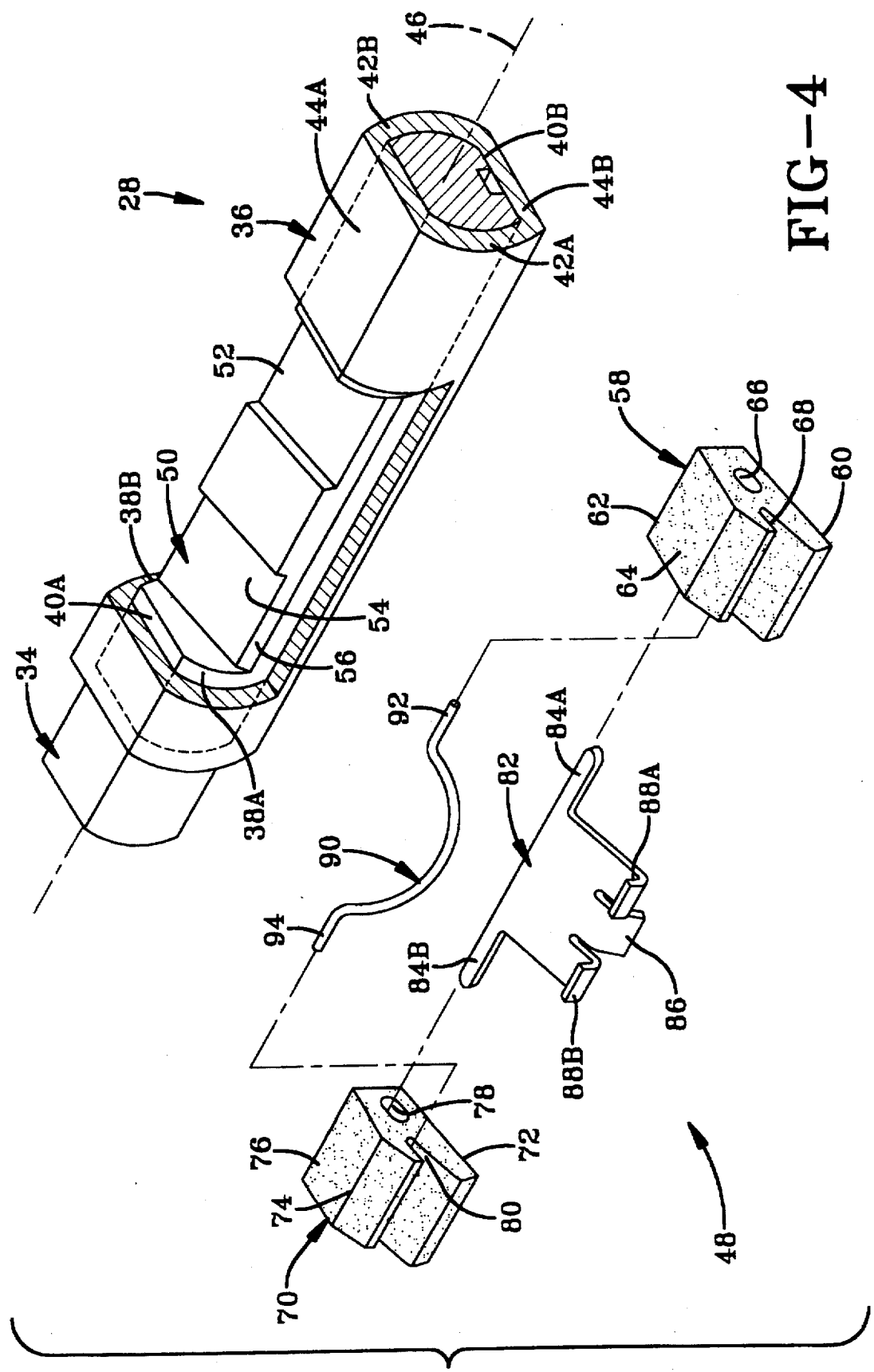
FIG. 4 is a fragmentary, exploded perspective view of the telescopeable shaft according to this invention.

As seen best in FIGS. 2-4, a unitized resilient insert 48 between the solid and tubular shafts 34,36 is disposed in a notch 50 in the flat side 40A of the solid shaft which is overlapped by the flat side 44A of the tubular shaft 36. The bottom of the notch 50 is interrupted by a lateral first ramp 52 and a coplanar, lateral second ramp 54 each convergent with the flat side 44A of the tubular shaft at an angle α of about 15°. The bottom of the notch 50 is further interrupted by a longitudinal ramp 56 which extends the length of the notch and which is convergent with the cylindrical segment 42A of the tubular shaft 36. The longitudinal ramp 56 intercepts the plane of the lateral ramps 52,54 at an angle β of about 120°.

The unitized resilient insert 48 includes a first slider 58 having a lower side 60 slideable on the lateral first ramp 52, a contact edge 62 on an upper side 64, a side-opening socket 66, and a slot-like spring seat 68 open toward the cylindrical segment 42A of the tubular shaft. A second slider 70 of the unitized resilient insert 48 has a lower side 72 slideable on the lateral second ramp 54, a contact edge 74 on an upper side 76, a side-opening socket 78 facing the socket 66 in the first slider, and a slot-like spring seat 80 open toward the cylindrical segment 42A of the tubular shaft. A generally flat third slider 82 includes a pair of laterally extending arms 84A-84B loosely received in the sockets 66,78, respectively, in the first and second sliders 58,70, a downturned center tab 86, and a pair of upwardly curled bumpers 88A-88B on opposite sides of the center tab. The sliders 58,70 may be made of plastic such as 6/6 Nylon. The slider 82 may be made of metal or plastic such as 6/6 Nylon.

As seen best in FIGS. 2-4, a bowed spring 90 has a first end 92 loosely seated in the spring seat 68 on the first slider 58 and a second end 94 loosely seated in the spring seat 80 on the second slider 70. Between its first and second ends 92,94, the spring 90 bears against each of the bumpers 88A-88B on the third slider 82 and is thus flexed between the third slider and each of the first and second sliders 58,70. The sockets 66,78 cooperate with the lateral arms 84A-84B to prevent the spring 90 from ejecting the third slider 82 from the first and second sliders 58,70. Once the insert 48 is installed in the notch 50, the spring 90 urges each of the lateral first and second sliders 58, 70 toward the convergence of the first and second lateral ramps 52,54 with the flat side 44A of the tubular shaft 36 and the tab 86 and the bumpers 88A-88B on the third slider toward the convergence of the longitudinal ramp 56 with the cylindrical segment 42A of the tubular shaft 36.

The first slider 58 engages the flat side 44A on the contact edge 62 and the second slider 70 engages the flat side 44A on the contact edge 74. The resultant force reactions between the first and second sliders 58, 70 and the flat side 44A of the tubular shaft are perpendicular to the flat side 44A and equally spaced laterally from the center of the flat sides 40A,44A, FIG. 2, so that the solid and tubular shafts 34,36 are spread apart perpendicular to their flat sides 40A-40B, 44A-44B, respectively, until running clearance in that direction is eliminated and the flat side 40B seats flush against the flat side 44B. The equal lateral spacing of the resultant force reactions on opposite sides of the center of the flat sides 40A,44A minimizes relative rotation or tilting of the solid shaft 34 in the tubular shaft. With respect to relative displacement between the solid and tubular shafts perpendicular to the flat sides 40A-40B, 44A-44B, the mechanical advantage attributable to the ramps 52,54 multiplies the effort of the spring 90 so that torque transfer between the solid and tubular shafts is substantially lash-free without the spring 90 being as stiff as prior springs used to eliminate angular lash in prior intermediate steering shafts of comparable size.

The spring 90 effectively wedges the tab 86 and the bumpers 88A-88B of the third slider 82 between the longitudinal ramp 56 and the cylindrical segment 42A of the tubular shaft such that the solid and tubular shafts 34,36 are spread apart parallel to their parallel flat sides 40A-40B, 44A-44B until running clearance in that direction is eliminated and the cylindrical segment 38B of the solid shaft bears flush against the cylindrical segment 42B of the tubular shaft. The bumpers 88A-88B are spaced apart on opposite sides of the downturned tab 86 to resist articulation between the solid and tubular shafts in a plane parallel to their parallel flat sides 40A-40B, 44A-44B.

We claim:

1. A rotary telescopeable shaft comprising:

a tubular shaft having a pair of diametrically opposite parallel flat sides and a pair of diametrically opposite cylindrical segments, a solid shaft slidably telescoped in said tubular shaft having a pair of diametrically opposite parallel flat sides facing said parallel flat sides of said tubular shaft and engageable thereon to effect a rotary driving connection and a pair of diametrically opposite cylindrical segments facing said cylindrical segments of said tubular shaft with running clearance between said solid shaft and said tubular shaft parallel to and perpendicular to said flat sides, a notch in one of said pair of flat sides of said solid shaft overlapped by a corresponding one of said flat sides of said tubular shaft, a pair of lateral ramps on a bottom of said notch converging with said one flat side of said tubular shaft, a longitudinal ramp on said bottom of said notch converging with one of said pair of cylindrical segments of said tubular shaft, a first slider, a second slider, a third slider, a spring urging relative separation between said third slider and each of said first and said second sliders, and means operative to prevent said spring from ejecting said third slider from each of said first and said second sliders, said first slider, said second slider, said third slider, and said spring being disposed in said notch with said spring wedging said first and said second sliders between said pair of lateral ramps and said one flat side of said tubular shaft to eliminate running clearance perpendicular to said flat sides by spreading apart said solid and said tubular shafts perpendicular to said flat sides and to eliminate running clearance parallel to said flat sides by wedging said third slider between said longitudinal ramp and said one cylindrical segment of said tubular shaft to spread apart said solid shaft and said tubular shaft parallel to said flat sides.

2. The rotary telescopeable shaft recited in claim 1 further comprising:

a contact edge on said first slider, and a contact edge on said second slider, said first and said second contact edges bearing against said one flat side of said tubular shaft and being equally spaced from a lateral center of said one flat side of said tubular shaft to minimize tilting of said solid shaft in said tubular shaft.

3. The rotary telescopeable shaft recited in claim 2 wherein said means operative to prevent said spring from ejecting said third slider from each of said first and said second sliders comprises:

a socket in said first slider, a socket in said second slider, a first arm on said third slider seated loosely in said first socket, and a second arm on said third slider seated loosely in said second socket.

* * * * *